Patented Nov. 1, 1932

1,885,355

UNITED STATES PATENT OFFICE

PAUL C. JONES, OF CUYAHOGA FALLS, OHIO, ASSIGNOR TO THE B. F. GOODRICH COMPANY, OF NEW YORK, N. Y., A CORPORATION OF NEW YORK

METHOD OF MAKING SECONDARY AROMATIC AMINES

No Drawing.   Application filed January 31, 1929.   Serial No. 336,659.

This invention relates to the art of manufacturing organic chemicals and has as its object to provide an improved method for the manufacture of secondary aromatic amines, such as the di-aryl p-phenylene diamines.

Heretofore symmetrical di-beta-naphthyl p-phenylene diamine has been made by heating p-phenylene diamine and an excess of beta-naphthol in a closed vessel to a temperature of 200° C. for a prolonged period of time (14 hours or more), and extracting unreacted materials and by-products by washing successively with caustic alkali, hydrochloric acid, alcohol and ether. The yield obtained is quite low, about 40% in some cases. The yield has been improved by adding 1/3% of iodine to catalyze the reaction, but the iodine is very expensive and greatly increases the cost of the product, as well as introducing complications because of the necessity of removing the catalyst from the product.

I have discovered that an excellent yield of very pure product may be obtained by heating a mixture of one molecular equivalent of p-phenylene diamine and a considerable excess, say a 50% excess, that is, three molecular equivalents, of beta-naphthol, to a temperature well over 200°, preferably as high as 300° C., and preferably in the absence of air. The reaction may be represented by the following equation:

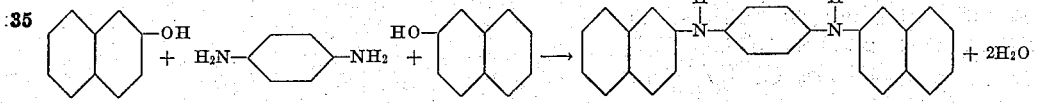

The product is allowed to cool, is broken up, and washed with alcohol, either methanol or ethanol being satisfactory. The alcohol dissolves the unreacted excess of beta-naphthol, leaving a high yield of very pure symmetrical di-beta-naphthyl p-phenylene diamine.

If desired, the alcohol solution containing the excess beta-naphthol is charged into the reaction vessel together with a fresh batch of p-phenylene diamine and an approximately theoretical quantity (a slight excess over two molecular equivalents) of beta-naphthol. As the reaction vessel is heated the alcohol boils off and may be condensed and recovered for further use. The vessel then contains the p-phenylene diamine and the beta-naphthol in the same ratio as the original batch, and the process is conducted from this point on in the manner described above.

The method of this invention makes possible the production of the dinaphthyl p-phenylene diamine in a much shorter time than the previously known methods, and therefore makes possible a greatly increased output from any given equipment. The use of apparatus at atmospheric pressure instead of closed containers under pressure also reduces the required capital outlay. The yield is increased to almost 100%, eliminating wasteful, troublesome by-products, the use of a catalyst is eliminated, and the purification process is greatly simplified.

As a specific illustration of the process of this invention, di-beta-naphthyl p-phenylene diamine is made on a large scale as follows: 400 lbs. of beta-naphthol and 100 lbs. of p-phenylene diamine are placed in an iron kettle equipped with a tight-fitting cover and a condenser. The kettle is heated by a direct flame. The reacting materials soon melt and dissolve in one another. As the temperature reaches about 220° C. water begins to be given off. The heating is continued until the temperature of the mixture is 300° C. The reaction is vigorous, water being evolved rapidly. After two hours at 300° C. the reaction is complete and the mixture is allowed to cool. The product is broken up and ground to a fine powder, which is stirred up with 115 gal. of hot denatured alcohol. The liquid is filtered and the cake is washed with 25 gal. of cold alcohol. The washed product is dried in the air and is then ready to use. The yield is better than 98% of the amount calculated from the theory and the product is almost 100% pure.

The alcohol solution containing the excess beta-naphthol is returned to the kettle, where the beta-naphthol may be recovered by distilling off the alcohol. If it is desired to make a number of batches, another 100 lbs. of p-phenylene diamine and 270 lbs. of beta-naphthol are added to the alcohol solution in the kettle and the heating is repeated as in the preparation of the first batch except that the alcohol which boils off at the beginning of the heating is condensed and saved.

I claim:

1. The method of making symmetrical di-beta-naphthyl p-phenylene diamine which comprises heating a mixture of p-phenylene diamine and a 50% excess of beta-naphthol at atmospheric pressure to a temperature of about 300° C. in the absence of a catalyst.

2. The method of making symmetrical di-beta-naphthyl p-phenylene diamine which comprises heating a mixture of p-phenylene diamine and an excess of beta-naphthol to a temperature of about 300° C. in the absence of a catalyst, and washing the excess of beta-naphthol from the product with an alcohol volatile at normal temperatures.

3. The method of making successive batches of symmetrical di-beta-naphthyl p-phenylene diamine which comprises heating a mixture of p-phenylene diamine and an excess of beta-naphthol to a temperature of about 300° C., dissolving the excess of beta-naphthol from the product with an alcohol volatile at normal temperatures, and adding the alcohol solution of beta-naphthol to a later batch to make up the desired excess of beta-naphthol.

4. The method of making successive batches of symmetrical di-beta-naphthyl p-phenylene diamine which comprises heating a mixture of p-phenylene diamine and a 50% excess of beta-naphthol to a temperature of about 300° C., dissolving the excess beta-naphthol from the finely ground product with ethanol, and adding the ethanol solution of beta-naphthol to a succeeding batch containing only a slight excess of beta-naphthol.

In witness whereof I have hereunto set my hand this 24th day of January, 1929.

PAUL C. JONES.